(12) United States Patent
Wang et al.

(10) Patent No.: US 8,443,442 B2
(45) Date of Patent: May 14, 2013

(54) SIGNATURE-FREE BUFFER OVERFLOW ATTACK BLOCKER

(75) Inventors: Xinran Wang, State College, PA (US); Chi-Chun Pan, State College, PA (US); Peng Liu, State College, PA (US); Sencun Zhu, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 1159 days.

(21) Appl. No.: 11/668,699

(22) Filed: Jan. 30, 2007

(65) Prior Publication Data

US 2008/0022405 A1 Jan. 24, 2008

Related U.S. Application Data

(60) Provisional application No. 60/763,789, filed on Jan. 31, 2006.

(51) Int. Cl.
*H04L 29/06* (2006.01)

(52) U.S. Cl.
USPC ............. 726/23; 709/226; 709/231; 709/233; 709/234

(58) Field of Classification Search ...................... 726/23
See application file for complete search history.

(56) References Cited

U.S. PATENT DOCUMENTS

| | | | | |
|---|---|---|---|---|
| 6,201,844 B1 * | 3/2001 | Bailleul | ........................ | 375/372 |
| 6,988,208 B2 * | 1/2006 | Hrabik et al. | .................. | 726/23 |
| 7,096,498 B2 * | 8/2006 | Judge | ............................... | 726/22 |
| 7,124,438 B2 * | 10/2006 | Judge et al. | ....................... | 726/22 |
| 7,206,805 B1 * | 4/2007 | McLaughlin, Jr. | ............ | 709/203 |
| 7,290,056 B1 * | 10/2007 | McLaughlin, Jr. | ............ | 709/230 |
| 7,313,822 B2 * | 12/2007 | Ben-Itzhak | ...................... | 726/24 |
| 7,328,457 B1 * | 2/2008 | Mister | .............................. | 726/30 |
| 7,392,453 B2 * | 6/2008 | Van Dijk et al. | .............. | 714/752 |
| 7,392,543 B2 * | 6/2008 | Szor | ................................ | 726/23 |

(Continued)

OTHER PUBLICATIONS

Cheon, Kangsik; Panwar, Shivendra S. Early Selective Packet Discard for Alternating Resource Access of TCP over ATM-UBR. 22nd Annual Conference on Local Computer Networks. Pub. Date: 1997. Relevant pp. 306-316. Found on the World Wide Web at: http://ieeexplore.ieee.org/stamp/stamp.jsp?tp=&arnumber=631000.*

(Continued)

*Primary Examiner* — Nathan Flynn
*Assistant Examiner* — Jeremiah Avery
(74) *Attorney, Agent, or Firm* — Gifford, Krass, Sprinkle, Anderson & Citkowski, P.C.

(57) ABSTRACT

A real-time, signature-free, blocker prevents buffer overflow attacks. The system and method, called SigFree, can filter out code injection buffer overflow attack packets targeting at various Internet services such as web services. Motivated by the observation that buffer overflow attacks typically contain executables whereas legitimate client requests never contain executables in most Internet services, SigFree blocks attacks by checking, without any preknowledge of the real attacks, if "executable" instruction sequences can be blindly disassembled and extracted from a packet. Being signature-free, the invention can block new and unknown buffer overflow attacks. It is immunized from almost every attack-side code obfuscation method, and transparent to the servers being protected. The approach is therefore suited to economical Internet-wide deployment with very low deployment and maintenance costs. SigFree can also handle encrypted SSL packets. An experimental study shows that SigFree can block all types of code-injection attack packets without yielding any false positives or false negatives. Moreover, SigFree causes negligible throughput degradation to normal client requests.

12 Claims, 9 Drawing Sheets

U.S. PATENT DOCUMENTS

| | | | |
|---|---|---|---|
| 7,463,590 B2 * | 12/2008 | Mualem et al. | 370/241 |
| 7,555,777 B2 * | 6/2009 | Swimmer et al. | 726/23 |
| 7,761,917 B1 * | 7/2010 | Kumar | 726/23 |
| 2003/0204719 A1 | 10/2003 | Ben-Itzhak | |
| 2006/0021054 A1 | 1/2006 | Costa et al. | |
| 2007/0180509 A1 * | 8/2007 | Swartz et al. | 726/9 |
| 2009/0328185 A1 * | 12/2009 | Berg et al. | 726/13 |

OTHER PUBLICATIONS

Costa, M., J. Crowcroft, M. Castro, A. Rowstron, L. Zhou, L. Zhang, and P. Barham. "Vigilante: End-to-End Containment of Internet Worms." Proceedings of 2005 ACM Symposium on Operating Systems Principles, Sep. 2005.

Kruegel, C., E. Kirda, D. Mutz, W. Robertson, and G. Vigna. "Polymorphic Worm Detection Using Structural Information of Executables." RAID 2005.

Lakhotia, A. and E.U. Kumar. "Abstract Stack Graph to Detect Obfuscated Calls in Binaries." Proceedings of the Fourth International Workshop on Source Code Analysis and Manipulation, Sep. 2004.

Kruegel, C., W. Robertson, F. Valeur, and G. Vigna. "Static Disassembly of Obfuscated Binaries." Proceedings of USENIX Security Symposium, Aug. 2004.

Christodorescu, M., S. Jha, S.A. Seshia, D. Song, R.E. Bryant. "Semantics-Aware Malware Detection." IEEE Symposium on Security and Privacy, Oakland, May 2005.

Chinchani, R. And E. van den Berg. "A Fast Static Analysis to Detect Exploit Code Inside Network Flows." RAID 2005.

Christodorescu, M. and S. Jha. "Static Analysis of Executables to Detect Malicious Patterns." Proceedings of the 12th USENIX Security Symposium, Aug. 2003.

Lin, J. et al., Abstraction-Based Misuse Detection: High-Level Specifications and Adaptable Strategies, *Proc. 11th IEEE Computer Security Foundations Workshop*, Rockport, MA, Jun. 1998, pp. 190-201.

\* cited by examiner (a.)

(b)

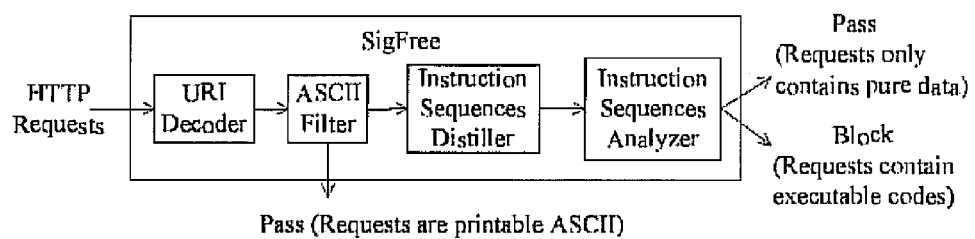
FIGURE 2
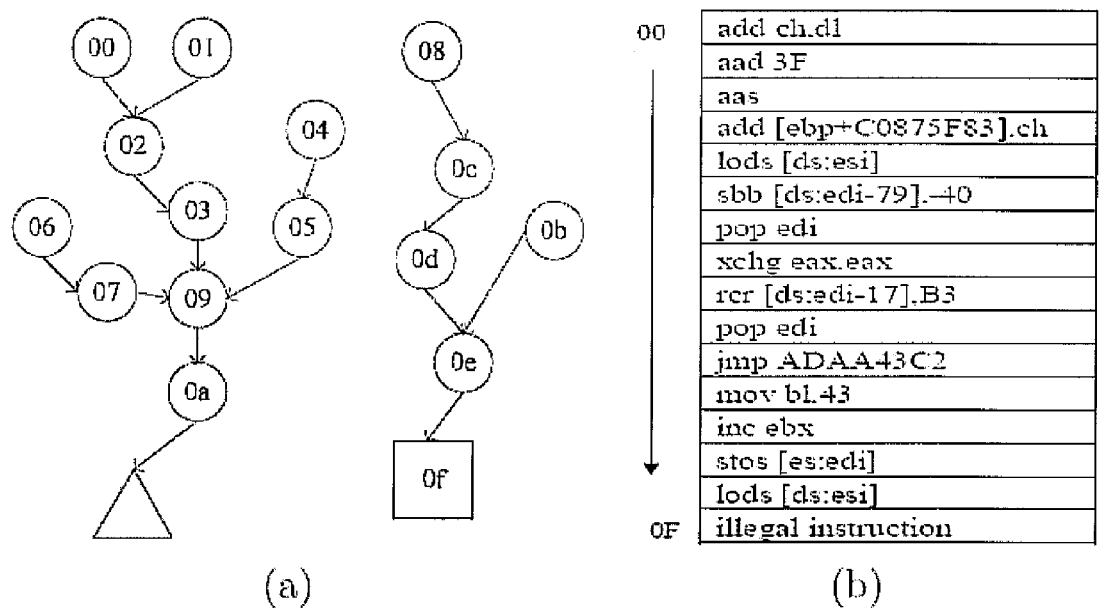
FIGURE 3A
FIGURE 3B

| | | |
|---|---|---|
| ... | ... | ... |
| I1: mov eax,2 | (ecx is undefined at this point) | J1: mov eax,2 |
| ... | K1: mov eax,ecx | (ebx is undefined at this point) |
| I2: mov eax,3 | ... | J2: mov eax,ebx |
| ... | | ... |
| (a) | (b) | (c) |
| FIGURE 5A | FIGURE 5B | FIGURE 5C |

0: push 5B
2: pop ecx
3: call 0x07
7: inc ecx
9: pop esi
a: xor [ds:esi+ecx+7],cl
e: loopd short 0x0a (c)

(a)

SIGNATURE-FREE BUFFER OVERFLOW ATTACK BLOCKER

REFERENCE TO RELATED APPLICATION

This application claims priority from U.S. Provisional Patent Application Ser. No. 60/763,789, filed Jan. 31, 2006, the entire content of which is incorporated herein by reference.

FIELD OF THE INVENTION

This invention relates generally to computer network security and, in particular, to prevention/detection techniques of buffer overflows; worm detection and signature generation; and machine code analysis for security purposes.

BACKGROUND OF THE INVENTION

Throughout the history of cyber security, buffer overflow is one of the most serious vulnerabilities in computer systems. (Note that according to this disclosure 'buffer' could be a stack or heap.) Buffer overflow vulnerabilities are a "root" cause for most of the cyber attacks such as server break-ins, worms, zombies, and botnets. Buffer overflow attacks are the most popular choice in these attacks, as they provide substantial control over a victim host.

A buffer overflow occurs during program execution when a fixed-size buffer has had too much data copied into it. This causes the data to overwrite into adjacent memory locations, and, depending on what is stored there, the behavior of the program itself might be affected. [2] Taking a broader viewpoint, buffer overflow attacks do not always carry code in their attacking requests (or packets),[1] code-injection buffer overflow attacks such as stack smashing may account for most of the buffer overflow attacks that have occurred thus far.

[1] An attack may direct execution control to existing system code or change the values of certain function arguments.

Although considerable of research has been done to tackle buffer overflow attacks, existing defenses are still quite limited in meeting four highly-desired requirements: (R1) simplicity in maintenance; (R2) transparency to existing (legacy) server OS, application software, and hardware; (R3) resiliency to obfuscation; and (R4) economical Internet wide deployment. As a result, although several very "secure" solutions have been proposed, they are not pervasively deployed, and many buffer overflow attacks continue to succeed each day.

To see how existing defenses are limited in meeting these four requirements, let us break down the existing buffer overflow defenses into six classes which we will review below: (1A) Finding bugs in source code; (1B) Compiler extensions; (1C) OS modifications; (1D) Hardware modifications; (1E) Defense-side obfuscation [3, 4]; and (1F) Capturing code running symptoms of buffer overflow attacks [1, 5-7]. (Note that the above list does not include binary code analysis based defenses which we will address shortly.) We may briefly summarize the limitations of these defenses in terms of the four requirements as follows. (a) Class 1B, 1C, 1D, and 1E defenses may cause substantial changes to existing (legacy) server OS, application software, and hardware, thus they are not transparent. Moreover, Class 1E defenses generally cause processes to be terminated. As a result, many businesses do not view these changes and the process termination overhead as economical deployment. (b) Class 1F defenses can be very secure, but they either suffer from significant runtime overhead or need special auditing or diagnosis facilities which are not commonly available in commercial services. As a result, Class 1F defenses have limited transparency and potential for economical deployment. (c) Class 1A defenses need source code, but source code is unavailable to many legacy applications.

Besides buffer overflow defenses, worm signatures can be generated and used to block buffer overflow attack packets [8-10]. Nevertheless, they are also limited in meeting the four requirements, since they either rely on signatures, which introduces maintenance overhead, or are not very resilient to attack-side obfuscation.

SUMMARY OF THE INVENTION

This invention resides in a real-time, signature-free, buffer overflow attack blocker. The system and method, called Sig-Free, can filter out code injection buffer overflow attack packets targeting at various Internet services such as web services.

Motivated by the observation that buffer overflow attacks typically contain executables whereas legitimate client requests never contain executables in most Internet services, SigFree blocks attacks by checking, without any preknowledge of the real attacks, if "executable" instruction sequences can be blindly disassembled and extracted from a packet.

As SigFree is signature-free, it can block new and unknown buffer overflow attacks. It is is immunized from almost every attack-side code obfuscation method, and is transparent to the servers being protected. Accordingly, SigFree is suited to economical Internet-wide deployment with very low deployment and maintenance costs. SigFree can also handle encrypted SSL packets. SigFree can block all types of code-injection attack packets without yielding any false positives or false negatives, while causing negligible throughput degradation to normal client requests.

BRIEF DESCRIPTION OF THE DRAWINGS

FIG. 2 shows the architecture of SigFree;

FIG. 3 shows the data structure of the distilled instruction sequences of the request of FIG. 1A, wherein FIG. 3A shows the extended instruction flow graph, and FIG. 3B shows the array of all possible instructions in the request;

FIG. 5A shows the define-define data flow anomaly in execution paths;

FIG. 5B shows the undefine-reference data flow anomaly in execution paths;

FIG. 5C shows the define-undefine data flow anomaly in execution paths;

DETAILED DESCRIPTION OF TEE INVENTION

Figure 1A:
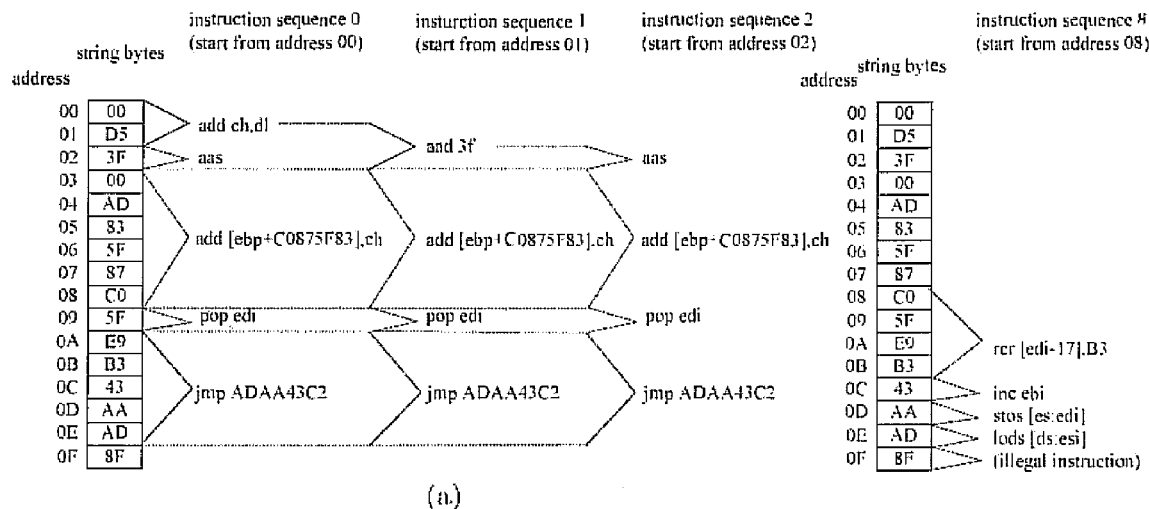
FIG. 1A illustrates sequences distilled from a substring of a GIF file.

This invention resides in a real time buffer overflow attack blocker for protecting Internet services. The invention, called SigFree, follows from the observation that "the nature of communication to and from network services is predominantly or exclusively data and not executable code."[11]. In particular, as summarized in [11]:

(a) on Windows platforms, most web servers (port 80) accept data only; remote access services (ports 111, 137, 138, 139) accept data only; Microsoft SQL Servers (port 1434) accept data only; workstation services (ports 139 and 445) accept data only.

(b) On Linux platforms, most Apache webservers (port 80) accept data only; BIND port 53) accepts data only; SNMP (port 161) accepts data only; most Mail Transport (port 25) accepts data only; Database servers (Oracle, MySQL, PostgreSQL) at ports 1521, 3306 and 5432 accept data only.

Since remote exploits are typically executable code, this observation indicates that if we can precisely distinguish (service requesting) packets that contain code from those that do not contain any code, we can protect most Internet services (which accept data only) from code-injection buffer overflow attacks by blocking the packets that contain code without causing any denial-of-service.

Accordingly, SigFree works as follows. SigFree is a 'proxy' that typically stays between a service and the corresponding firewall. When a service requesting packet arrives at SigFree, SigFree first uses a new O(N) algorithm to disassemble and "distill" all possible instruction sequences from the packet's payload, where every byte in the payload is considered as a possible starting point of the code embedded (if any). However, in this phase some data bytes may be mistakenly "decoded" as instructions. In phase 2, SigFree uses a novel (data flow analysis based) algorithm to check whether an instruction sequence (distilled in phase 1) is really a segment of a program. Since SigFree integrates analysis and blocking into a single process, SigFree can work in real time and is signature free, and SigFree can block any kind of buffer overflow attacks as long as they contain executables.

We have implemented a SigFree prototype as a proxy to protect web servers. Our empirical study shows that there exists clean-cut "boundaries" between code-embedded payloads and data payloads when our code-data separation criteria are applied. We have identified the "boundaries" (or thresholds), and have been able to detect/block all 50 attack packets generated by Metasploit framework [12], as well as all 200 polymorphic shell code packets generated by two well-known polymorphic shell code engine ADMmutate [13] and CLET [14], and worm Slammer, CodeRed and a CodeRed variation, when they are well mixed with various types of data packets. Our experiments have not yielded any false positives or false negatives. Also, our experiment results show the throughput degradation caused by SigFree is negligible.

The uniqueness and merits of SigFree are summarized below. They show that SigFree has taken a main step forward in meeting the four requirements aforementioned. They also separate SigFree from other binary code analysis based attack blockers such as [11] and [15], as we will shortly elaborate below.

SigFree is signature-free; thus, it can block new and unknown buffer overflow attacks Avoiding blocking attack packets via string-matching, SigFree is immunized from almost every attack-side obfuscation method.

SigFree achieves zero false positive rate and zero false negative rate on all the test data.

SigFree uses generic code-data separation criteria instead of specific instruction patterns. This feature separates SigFree from [11], an independent work that tries to detect code-embedded packets.

Transparency. SigFree is a out-of-the-box solution that requires no server side changes.

SigFree has negligible throughput degradation.

SigFree is an economical deployment with very low maintenance cost, which can be well justified by the aforementioned features.

SigFree can handle encrypted SSL packets.

Wide applicability. SigFree can protect any Internet service that accepts data only.

Prevention/Detection of Buffer Overflows

As discussed in the Background of the Invention, existing prevention/detection techniques of buffer overflows can be roughly broken down into six classes:

Class 1A: Finding bugs in source code. Buffer overflows are fundamentally due to programming bugs. Accordingly, various bug-finding tools have been developed through such work as[16-18] and Flawfinder.[2] The bug-finding techniques used in these tools, which in general belong to static analysis, include but not limited to model checking and bugs-as-deviant-behavior. Class 1A techniques are designed to handle source code only, and they do not ensure completeness in bug finding. In contrast, SigFree handles machine code embedded in a request (packet).

[2] http://www.dwheeler.com/flawfinder/

Class 1B: Compiler extensions. "If the source code is available, a developer can add buffer overflow detection automatically to a program by using a modified compiler." [2] Three such compilers are StackGuard [19], ProPolice,[3] and Return Address Defender (RAD) [20]. Class 1B techniques require the availability of source code. In contrast, SigFree does not need to know any source code.

[3] http://www.research.ibm.com/trl/projects/security/ssp/

Class 1C: OS modifications. Modifying some aspect of the operating system may prevent buffer overflows such as Pax

[21], LibSafe [22] and e-NeXsh [23]. Class 1C techniques need to modify the OS. In contrast, SigFree does not need any modification of the OS.

Class 1D: Hardware modifications. A main idea of hardware modification is to store all return addressed on the processor [24]. In this way, no input can change any return address.

Class 1E: Defense-side obfuscation. Instruction set randomization approaches are proposed in [3,4]. Address Space Layout Randomization (ALSO) is a main component of Pox [21]. A comprehensive address space randomization scheme is proposed in [25]. Address-space randomization, in its general form [25], can detect exploitation of all memory errors. Instruction set randomization can detect all code injection attacks. Nevertheless, when these approaches detect an attack, the victim process is typically terminated. "Repeated attacks will require repeated and expensive application restarts, effectively rendering the service unavailable."[1]

Class 1F: Capturing code running symptoms of buffer overflow attacks. Fundamentally, buffer overflows are a code running symptom. If such unique symptoms can be precisely captured, all buffer overflows can be detected. Class 1B, Class 1C and Class 1E techniques can capture some—but not all—of the running symptoms of buffer overflows. For example, accessing non-executable stack segments can be captured by OS modifications; compiler modifications can detect return address rewriting; and process crash is a symptom captured by defense-side obfuscation. To achieve 100% coverage in capturing bufer overflow symptoms, dynamic dataflow/taint analysis techniques are proposed in [5, 6]. Dynamic dataflow/ taint analysis can detect buffer overflows during runtime. However, it may cause significant runtime overhead (e.g., 1,000%). To reduce such overhead, another type of Class 1F techniques, namely post-crash symptom diagnosis, has been developed in [1, 7]. Post-crash symptom diagnosis extracts the 'signature' after a buffer overflow attack is detected. Class 1F techniques can block both the attack requests that contain code and the attack requests that do not contain any code, but they need the signatures to be firstly generated. Moreover, they either suffer from significant runtime overhead or need special auditing or diagnosis facilities which are not commonly available in commercial services. In contrast, although SigFree could not block the attack requests that do not contain code, SigFree is signature-free and do not need any change to real world services.

Worm Detection and Signature Generation

Because buffer overflows are a key target of worms when they propagate from one host to another, SigFree is related to worm detection. Based on the nature of worm infection symptoms, worm detection techniques can be broken down into 3 classes: [Class 2A] techniques use such macro symptoms as Internet background radiation (observed by network telescopes) to raise early warnings of Internet wide worm infection [26]. [Class 2B] techniques use such local traffic symptoms as content invariance, content prevalence and address dispersion to generate worm signatures and/or block worms. Some example Class 2B techniques are Earlybird [8], Autograph [9], Polygraph [10], and TRW [27].[Class 2C] techniques use worm code running symptoms to detect worms. It is not surprising that Class 2C techniques are exactly Class 1F techniques. Some example Class 2B techniques are Shield [28], Vigilante [6], COVERS [7], and [7].

Class 2A techniques are not relevant to SigFree. Class 2C techniques are already discussed. Class 2B techniques rely on signatures, while SigFree is signature-free. Class 2B techniques focus on identifying the unique bytes that a worm packet must carry, while SigFree focuses on determining if a packet contains code or not. Class 2B techniques do not do any code analysis, but SigFree does. Exploiting the content invariance property, Class 2B techniques are typically not very resilient to obfuscation. In contrast, SigFree is immunized from almost every attack-side obfuscation method.

Machine Code Analysis for Security Purposes

Although source code analysis has been extensively studied (see Class 1A), in many real world scenarios source code is not available and the ability to analyze binaries is desired. Machine code analysis has three main security purposes: (P1) malware detection, (P2) to analyze obfuscated binaries, and (P3) to identify and analyze the code contained in buffer overflow attack packets. Along purpose P1, [29] uses static analysis techniques to detect malicious patterns in executables, and [30] exploits semantic heuristics to detect malware. Along purpose P2, [31] uses static analysis techniques to detect obfuscated calls in binaries, and disassembly of obfuscated binaries is investigated in [32].

SigFree is quite deferent from P1 and P2 techniques. They have very different purposes. The purpose of SigFree is to see if a packet contains code or not, instead of seeing if a piece of code has malicious intent or not. (Note that SigFree does not check if the code contained in a packet has malicious intent.) Due to this reason, P1 and P2 techniques are quite limited in handling obfuscated binaries, but SigFree is immunized from almost every attack-side obfuscation method. Nevertheless, both [32] and SigFree disassemble binary code, although their disassembly procedures are different, and disassembly is only a minor part of SigFree.

Finally, being generally a P3 technique, SigFree is most relevant to two P3 works, namely [15] and [11]. [15] exploits control flow structures to detect polymorphic worms. Unlike string-based signature matching, [15] identifies structural similarities between different worm mutations and use these similarities to detect more polymorphic worms. Although both [15] and SigFree handle binary code, [15] does offline analysis. In contrast, SigFree is an online attack blocker. So SigFree and [15] are complementary to each other with different purposes. Moreover, unlike SigFree, [15] is not suitable to block the code contained in every attack packet, since some buffer overflow code is so simple that there is very little control flow information can be exploited. Finally, it is possible that attackers obfuscate the control flow structure of their code by such obfuscation techniques as opaque predict and branch function [331].

Independent of our work, [11] proposes a pattern-based scheme to achieve the same goal of SigFree, that is, to detect exploit code in network flows. However, there is a fundamental difference between SigFree and [11], that is, [11] is pattern-based thus it relies on the awareness of certain instruction patterns, while SigFree is a generic approach which does not require any pre-known patterns. [11] first finds certain pre-known instruction patterns in a packet. Then, [11] uses the found patterns and a data flow analysis technique called program slicing to analyze the packet's payload to see if the packet really contains code. On one hand, this scheme is limited by the set of patterns since it is always possible for attackers to bypass those pre-known patterns. On the other hand, more patterns mean more overhead and longer latency in filtering packets. In contrast, although SigFree also exploits dataflow analysis, SigFree uses it to find basic differences between code and data, which are hard for exploit code to evade.

Basic Definitions

An instruction sequence is a sequence of CPU instructions which has one and only one entry instruction and there exist at least one execution path from the entry instruction to any other instruction in this sequence. It is referred to by its entry instruction. A fragment of a program in machine language is an instruction sequence, but an instruction sequence is not necessarily a fragment of a program. In fact, we may distill instruction sequences from any binary strings. FIG. 1A shows four instruction sequences distilled from a substring of a GIF file. These four instruction sequences are not fragments of a real program, although they may also be executed in a specific CPU. Below we call them random instruction sequences, whereas use the term binary executable code to refer to a fragment of a real program in machine language.

An instruction flow graph (IFG) is a directed graph $G=(V, E)$ where each node $v \in V$ corresponds to an instruction and each edge $e=(v_i, v_j) \in E$ corresponds to a possible transfer of control from instruction $v_i$ to instruction $v_j$. Unlike traditional control flow graph (CFG), a node of an IFG corresponds to a single instruction rather than a basic block of instructions. To completely model the control flow of an instruction sequence, we further extend the above definition.

An extended instruction flow graph (EIFG) is a directed graph $G=(V,E)$ which satisfies the following properties: each node $v \in V$ corresponds to an instruction, an illegal instruction, or an external address; each edge $e=(v_i, v_j) \in E$ corresponds to a possible transfer of control from instruction $v_i$ to instruction $v_j$, to illegal instruction $v_j$, or to an external address $v_j$.

Accordingly, we name the types of nodes in an EIFG instruction node, illegal instruction node, and external address node.

The reason that we define IFG and EIFG is to model two special cases which CFG cannot model (the difference will be very evident in the following sections). First, in an instruction sequence, control may be transferred from an instruction node to an illegal instruction node. For example, in instruction sequence 08 in FIG. 1A, the transfer of control is from instruction "lods [ds:esi]" to an illegal instruction at address 0F. Second, control may be transferred from an instruction node to an external address node. For example, instruction sequence 00 in FIG. 1A has an instruction "jmp ADAAC3C2", which jump to external address ADAAC3C2.

Attack Model

Figure 1B:
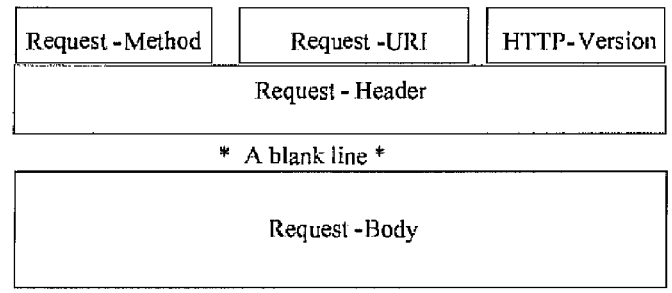
FIG. 1B is a HTTP request.

An attacker exploits a buffer overflow vulnerability of a web server by sending a crafted request, which contains a malicious payload. FIG. 1B shows the format of a HTTP request. There are several HTTP request methods among which GET and POST are most often used by attackers. Although HTTP 1.1 does not allow GET to have a request body, some web servers such as Microsoft IIS still dutifully read the request-body according to the request-header's instructions (the CodeRedworm exploited this very problem).

The position of a malicious payload is determined by the exploited vulnerability. A malicious payload may be embedded in the Request-URI field as a query parameter. However, as the maximum length of Request-URI is limited, the size of a malicious payload, hence the behavior of such a buffer overflow attack, is constrained. It is more common that a buffer overflow attack payload is embedded in Request-Body of a POST method request. Technically, a malicious payload may also be embedded in Request-Header, although this kind of attacks have not been observed yet. In this work, we assume an attacker can use any request method and embed the malicious code in any field.

Assumptions

In this description, we focus on buffer overflow attacks whose payloads contain executable code in machine language, and we assume normal requests do not contain executable machine code. A normal request may contain any data, parameters, or even a SQL statement. Note that although SQL statements are executable in the application level, they cannot be executed directly by a CPU. As such, SQL statements are not viewed as executable in our model. Application level attacks such as data manipulation and SQL injection are out of the scope.

Though SigFree is a generic technique which can be applied to any instruction set, for concreteness we assume the web server runs the Intel IA32 instruction set, the most popular instruction set running inside a web server today.

Architecture

FIG. 2 depicts the architecture of SigFree.

URI decoder. The specification for URLs [34] limits the allowed characters in a Request-URI to only a subset of the ASCII character set. This means that the query parameters of a request-URI beyond this subset should be encoded [34]. Because a malicious payload maybe embedded in the request-URI as a request parameter, the first step of SigFree is to decode the request-URI.

ASCII Filter. Malicious executable code are normally binary strings. In order to guarantee the throughput and response time of the protected websystem, if the query parameters of the request-URI and request-body of a request are both printable ASCII ranging from 20-7E in hex, SigFree allows the request to pass.

Instruction sequences distiller (ISD). This module distills all possible instruction sequences from the query parameters of Request-URI and Request-Body (if the request has one).

Instruction sequences analyzer (ISA). Using all the instruction sequences distilled from the instruction sequences distiller as the inputs, this module analyzes these instruction sequences to determine whether one of them is (a fragment of) a program.

INSTRUCTION SEQUENCE DISTILLER

This section first proposes an executive algorithm to distill instruction sequences from http requests, followed by several excluding techniques to reduce the processing overhead of instruction sequences analyzer.

Distilling Instruction Sequences

To distill an instruction sequence, we first assign every byte of a request to an address. Then, we disassemble the request from a certain address until the end of the request is reached or an illegal instruction opcode is encountered. There are two traditional disassembly algorithms: linear sweep and recursive traversal [33, 35]. The linear sweep algorithm begins disassembly at a certain address, and proceeds by decoding each encountered instruction. The recursive traversal algorithm also begins disassembly at a certain address, but it follows the control flow of instructions.

In this paper, we employ the recursive traversal algorithm, because it can obtain the control flow information during the disassembly process. Intuitively, to get all possible instruction sequences from a N-byte request, we simply execute the disassembly algorithm N times and each time we start from a different address in the request. This gives us a set of instruction sequences. The running time of this algorithm is $O(N^2)$.

One drawback of the above algorithm is that the same instructions are decoded many times. For example, instruction "pop edi" in FIG. 1A is decoded many times by this algorithm. To reduce the running time, we design a data structure, which is an EIFG, to represent the instruction sequences. To distill all possible instruction sequences from a request is simply to create the EIFG for the request. An EIFG is used to represent all possible transfers of control among these instructions. In addition, we use an instruction array to represent all possible instructions in a request. To traverse an instruction sequence, we simply traverse the EIFG from the entry instruction of the instruction sequence and fetch the corresponding instructions from the instruction array. FIG. 3 shows the data structure for the request shown in FIG. 1A. The details of the algorithm for creating the data structure are described in Algorithm 1. Clearly, the running time of this algorithm is O(N), which is optimal as each address is traversed only once.

---

Algorithm 1 Distill all instruction sequences from a request

```
initialize EISG G and instructions array A to empty
for each address i of the request do
    add instructions node i to G
i - the start address of the request
while i <= the end address of the request do
    inst - decode an instruction at i
    if inst is illegal then
        A[i] ← illegal instruction inst.
        set type of node i "illegal node" in G
    else
        A[i] ← instruction inst.
        If inst. is a control transfer instruction then
            for each possible target i of inst. do
                if target t is an external address then
                    add external address node t to G
                    add edge e(node t, node i) to G
            else
                add edge e(node t, node i + inst.length) to G
        t - i + 1
```

---

Excluding Instruction Sequences

The previous step may output many instruction sequences at different entry points. Next we exclude some of them based on several heuristics. Here excluding an instruction sequence means that the entry of this sequence is not considered as the real entry for the embedded code (if any).

The fundamental rule in excluding instruction sequences is not to affect the decision whether a request contains code or not. This rule can be translated into the following technical requirements: if a request contains a fragment of a program, the program must be one of the remaining instruction sequences or a subsequence of a remaining instruction sequence, or it differs from the a remaining sequence only by few instructions.

Step 1—If instruction sequence A is a subsequence of instruction sequence B, we exclude instruction sequence A. The rationale behind excluding the instruction sequence A is that if A satisfies some characteristics of programs, Balso satisfies these characteristics with a high probability.

This step helps exclude lots of instruction sequences since many distilled instruction sequences are subsequences of the other distilled instruction sequences. For example, in FIG. 3A, instruction sequences 02, 03, 09 and 0a, which are subsequence of instruction sequence 00, can be excluded. Similarly, instruction sequences 05, 07, 0c, 0d and 0e can be excluded.

Step 2—If instruction sequence A merges to instruction sequence B after a few instructions (e.g., 4 in our experiments) and A is no longer than B, we exclude instruction sequence A. It is reasonable to expect that B will preserve A's characteristics.

Many distilled instruction sequences are observed to merge to other instructions sequences after a few instructions. This property is called self-repairing [33] in Intel IA-32 architecture. For example, in FIG. 3A instruction sequence 01 merges to instruction sequence 00 only after one instruction. Therefore, instruction sequence 01 is excluded. Similarly, instruction sequences 06 and 0b can be excluded.

Step 3—For some instruction sequences, if we execute them, whatever execution path being taken, an illegal instruction is inevitably reachable. We say an instruction is inevitably reachable if two conditions holds. One is that there are no cycles (loops) in the EIFG of the instruction sequence; the other is that there are no external address nodes in the EIFG of the instruction sequence.

We exclude the instruction sequences in which illegal instructions are inevitably reachable, because causing the server to execute an illegal instruction is not the purpose of an buffer overflow attack. Note that however the existence of illegal instruction nodes cannot be used as a criteria to exclude an instruction sequence because otherwise attackers may obfuscate their program by adding non-reachable illegal instructions.

Based on this heuristic, we can exclude instruction sequence 08 and 0b in FIG. 3A, since both of them will eventually execute an illegal instruction of.

After these three steps, only instruction sequence 00 is left in FIG. 3A.

INSTRUCTION SEQUENCES ANALYZER

A distilled instruction sequence may be a sequence of random instructions or a fragment of a program in machine language. In this section, we propose two schemes to differentiate these two cases. Scheme 1 exploits the operating system characteristics of a program; Scheme 2 exploits the data flow characteristics of a program. Scheme 1 is slightly faster than Scheme 2, whereas Scheme 2 is much more robust to obfuscation.

Scheme 1

A program in machine language is dedicated to a specific operating system; hence, a program has certain characteristics implying the operating system on which it is ruining, for example calls to operating system or kernel library. A random instruction sequence does not carry this kind of characteristics. By identifying the call pattern in an instruction sequence, we can effectively differentiate a real program from a random instruction sequence.

More specifically, instructions such as "call" and "int 0x2eh" in Windows and "int 0x80h" in Linux may indicate system calls or function calls. However, since the op-codes of these call instructions are only one byte, even normal requests may contain plenty of these byte values. Therefore, using the number of these instructions as a criteria will cause a high false positive rate. To address this issue, we use a pattern composed of several instructions rather than a single instruction. It is observed that before these call instructions there are normally one or several instructions used to transfer parameters. For example, a "push" instruction is used to transfer parameters for a "call" instruction; some instructions that set values to registers al, ah, ax, or eax are used to transfer parameters for "int" instructions. These call patterns are very common in a fragment of a real program. Our experiments in Section 6 show that by selecting the appropriate parameters we can rather accurately tell whether an instruction sequence is an executable code or not.

Scheme 1 is fast since it does not need to fully disassemble a request. For most instructions, we only need to know their types. This saves lots of time in decoding operands of instructions.

Figure 4:
FIG. 4 shows an obfuscation example.

Note that although Scheme 1 is good at detecting most of the known buffer overflow attacks, it is vulnerable to obfuscation. One possible obfuscation is that attackers may use other instructions to replace the "call" and "push" instructions. FIG. 4 shows an example of obfuscation, where "cal-leax" instruction is substituted by "push J4" and "jmp eax".

Although we cannot fully solve this problem, by recording this kind of instruction replacement patterns, we may still be able to detect this type of obfuscation to some extent.

Another possible obfuscation is one which first encrypts the attack code and then decrypts it using a decryption routine during execution time [13]. This decryption routine does not include any calls, thus evading the detection of Scheme 1.

Scheme 2

To detect the aforementioned obfuscated buffer overflow attacks, Scheme 2 exploits the data flow characteristics of a program. Normally, a random instruction sequence is full of data flow anomalies, whereas a real program has few or no data flow anomalies. However, the number of data flow anomalies cannot be directly used to distinguish a program from a random instruction sequence because an attacker may obfuscate his program easily by introducing enough data flow anomalies.

In this description, we use the detection of data flow anomaly in a different way. We observe that when there are data flow anomalies in an execution path of an instruction sequence, some instructions are useless, whereas in a real program at least one execution path have a certain number of useful instructions. Therefore, if the number of useful instructions in an execution path exceeds a threshold, we conclude the instruction sequence is a segment of a program.

Data Flow Anomaly. The term data flow anomaly was originally used to analyze programs written in higher level languages in the software reliability and testing field [36, 37]. In this paper, we borrow this term and several other terms to analyze instruction sequences.

During a program execution, an instruction may impact a variable (register, memory location or stack) on three different ways: define, reference, and undefine. A variable is defined when it is set a value; it is referenced when its value is referred to; it is undefined when its value is not set or set by another undefined variable. Note that here the definition of undefined is different from that in a high level language. For example, in a C program, a local variable of a block becomes undefined when control leaves the block.

A data flow anomaly is caused by an improper sequence of actions performed on a variable. There are three data flow anomalies: define-define, define-undefine, and undefine-reference [37]. The define-define anomaly means that a variable was defined and is defined again, but it has never been referenced between these two actions. The undefine-reference anomaly indicates that a variable that was undefined receives a reference action. The define-undefine anomaly means that a variable was defined, and before it is used it is undefined. FIG. 5 shows an example.

Figure 6:
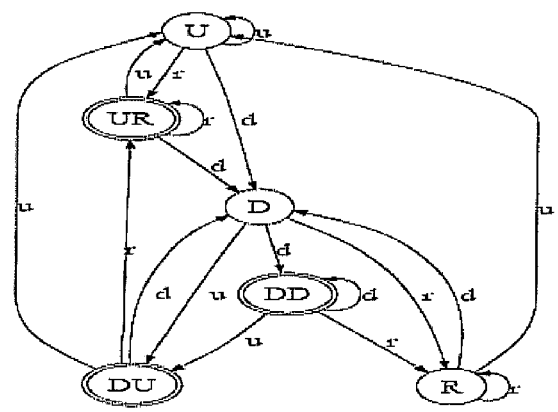
FIG. 6 shows a state diagram of a variable.

Detection of Data Flow Anomalies. There are static [36] or dynamic [37] methods to detect data flow anomalies in the software reliability and testing field. Static methods are not suitable in our case due to its slow speed; dynamic methods are not suitable either due to the need for real execution of a program with some inputs. As such, we propose a novel method called abstract execution, which does not require real execution of code. As a result of the abstract execution of an instruction, a variable could be in one of the six possible states. The six possible states are state U: undefined; state D: defined but not referenced; state R: defined and referenced; state DD: abnormal state define-define; state UR: abnormal state undefine-reference; and state DU: abnormal state define-undefine. FIG. 6 depicts the state diagram of these states. Each edge in this state diagram is associated with D, R or U, which represents "define", "reference", and "undefine", respectively.

We assume that a variable is in "undefined" state at the beginning of an execution path. Now we start to traverse this execution path. If the entry instruction of the execution path defines this variable, it will enter the state "defined". Then, it will enter another state according to the next instruction, as shown in FIG. 6. Once the variable enters an abnormal state, a data flow anomaly is detected. We continue this traversal to the end of the execution path. This process enables us to find all the data flow anomalies in this execution path.

Pruning Useless Instructions. Next we leverage the detected data flow anomalies to remove useless instructions. A useless instruction of an execution path is an instruction which does not affect the results of the execution path; otherwise, it is called useful instructions. We may find a useless instruction from a data flow anomaly. When there is an undefine-reference anomaly in an execution path, the instruction which causes the "reference" is a useless instruction. For instance, the instruction K1 in FIG. 5, which causes undefine-reference anomaly, is a useless instruction. When there is a define-define or define-undefine anomaly, the instruction that caused the former "define" is also considered as a useless instruction. For instance, the instructions I1 and J1 in FIG. 5 are useless instructions because they caused the former "define" in either the define-define or the define-undefine anomaly.

---

Algorithm 2 check if the number of useful instructions
in an execution path exceeds n threshold

---

Input: entry instruction of an instruction sequence, EISG G
    total ← 0; useless ← 0 ; stock ← empty
    initialize the states of all variables to "undefined"
    push the entry instruction,states,total and useless to stack
    while stack is not empty do
        pop the top item of stack to i,states,total and useless
        if total - useless greater than a threshold then
            return true
        if i is visited then
            continues
        mark i visited
        total - total + 1
        Abstractly execute instruction i (change the states of variables
        according to instruction i)
        If there is a define-define or define-undefine anomaly then
            useless ← useless + 1
        If there is a undefine-reference anomaly then
            useless ← useless + 1
        for each instruction g directly following i in the G do
            push g, states ,total and useless to stack
        return false

---

After pruning the useless instructions from an execution path, we will get a set of useful instructions. If the number of useful instructions in an execution path exceeds a threshold, we will conclude the instruction sequence is a segment of a program.

Algorithm 2 shows our algorithm to check if the number of useful instructions in an execution path exceeds a threshold. The algorithm involves a search over an EISG in which the nodes are visited in a specific order derived from a depth first search. The algorithm assumes that an EISG G and the entry instruction of the instruction sequence are given, and a push down stack is available for storage. During the search process, the visited node (instruction) is abstractly executed to update the states of variables, find data flow anomaly, and prune useless instructions in an execution path.

Handling Special Cases. Next we discuss several special cases in the implementation of Scheme 2.

General purpose instruction. The instructions in the IA32 instruction set can be roughly divided into the four groups: general purpose instructions, floating point unit instructions, extension instructions, and system instructions. General purpose instructions perform basic data movement, arithmetic, logic, program flow, and string operation, which are commonly used by programmers to write applications and system software that run on IA-32 processors [38]. General purpose instructions are also the most often used instructions in malicious code. We believe that malicious codes must contain a certain number of general purpose instructions to achieve the attacking goals. Other types of instructions may be leveraged by an attacker to obfuscate his real-purpose code, e.g., used as garbage in garbage insertion. As such, we prune other groups of instructions as well.

Initial state of registers. It is difficult for attackers to know the run-time values of registers before malicious code is executed since their values are unpredictable. Therefore, it is reasonable to assume that the initial states of all variables are "undefined" at the beginning of an execution path. The register "esp", however, is an exception since it is used to hold the stack pointer. Thus, we set register esp "defined" at the beginning of an execution path.

Indirect address. An indirect address is an address that serves as a reference point instead of an address to the direct memory location. For example, in the instruction "move eax, [ebx+01e8]", register "ebx" may contain the actual address of the operand. However, it is difficult to know the run-time value of register "ebx". Thus, we always treat a memory location to which an indirect address points as state "defined" and hence no data flow anomaly will be generated. Indeed, this treatment successfully prevents an attacker from obfuscating his code using indirect addresses.

Useless control transfer instructions. CTI instructions are useless if the state of status flags (control condition) is undefined or control transfer target is undefined. The status flags of the EFLAGS register in IA32 instruction set indicate the results of arithmetic and shift instructions, such as the ADD, SUB and SHL instructions. The condition instructions Jcc dump on condition code cc) and LOOPcc use one or more of the status flags as condition codes and test them for branch or end-loop conditions. During a program execution, an instruction may affect a status flag on three different ways: set, unset or undefine [50]. We consider both set and unset are define. As a result, a status flag could be in one of the two possible states—defined or undefined. To detect and prune useless CTIs, we assume that the initial state of all status flags are undefined. The states of status flags are updated during the process of code abstraction. Note attackers may evade the detection by using fewer useful instructions [51] than the threshold (15 in our experiments) of scheme 2.

Scheme 3.

Next we propose Scheme 3 which is robust to the aforementioned counter attack to Scheme 2. Unlike Scheme 2, Scheme 3 does not use the number of useful instructions as a criteria directly. Scheme 3 exploits interdependency of useful instructions in a program. We observe that at least one useful instruction depend on a certain number of other useful instructions in a real program, whereas all useful instructions in a random instruction depend on few other useful instructions. Therefore, if the number of useful instructions which a useful instruction depend on exceeds a threshold, we conclude the instruction sequence is a segment of a program.

Dependency is a binary relation over useful instructions in an instruction sequence. We say instruction j depend on instruction i, if instruction i produces a result used by instruction j. Note that the dependency relation is transitive, that is, if i depend on j and j depend on k, then i depend on k. We call the total number of useful instructions, which one useful instruction depends on, the dependent degree of that instruction. Our detection heuristic of Scheme 3 can be rewritten as: If maximum dependent degree of any useful instructions in an instruction sequence exceeds a threshold, we conclude the instruction sequence is a segment of a program.

Figures 7A, 7B:
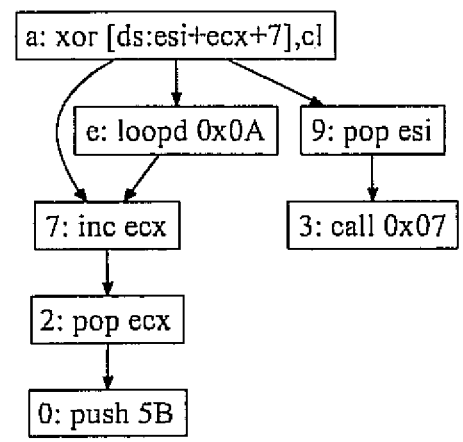
FIG. 7A shows a countdown decryption routine.
FIG. 7B shows a def-use graph of countdown decryption routine. Instruction a can reach all other instructions in the def-use graph and thus it depends on all other instructions. The maximum dependent degree in the instruction sequence is 6.

In order to calculate the dependent degree of a useful instruction, we construct a def-use graph. A def-use graph is a directed graph $G=(V, E)$ where each node $u \in V$ corresponds to a useful instruction and each edge $e=v_i, v_j) \in E$ indicates that instruction $v_j$ produces a result used by instruction $v_i$. Obviously, the instructions which a useful instruction can reach in the def-use graph are the instructions that the useful instruction depends on. FIG. 7B shows a def-use graph of countdown decryption routine. Instruction a can reach all other instructions in the def-use graph and thus it depends on all other instructions. The maximum dependent degree in the instruction sequence is 6.

EXPERIMENTS

Parameter Tuning

Both Scheme 1 and Scheme 2 use a threshold value to determine if a request contains code or not. Clearly, it is critical to set the threshold values appropriately so as to minimize both detection false positive rate and false negative rate. To find out the appropriate thresholds, we tested both schemes of SigFree against 50 attack requests generated by Metasploit framework, worm Slammer, CodeRed and a CodeRed variation, and 1500 binary requests of different types including encrypted data, audio, jpeg, png, gif and flash.

Figure 8A:
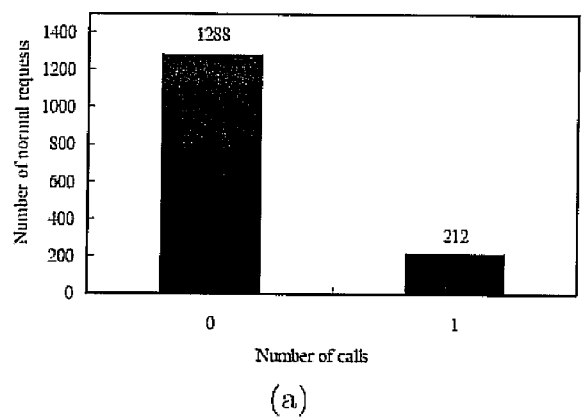
FIG. 8A shows the number of push-calls in a normal request.
Figure 8B:
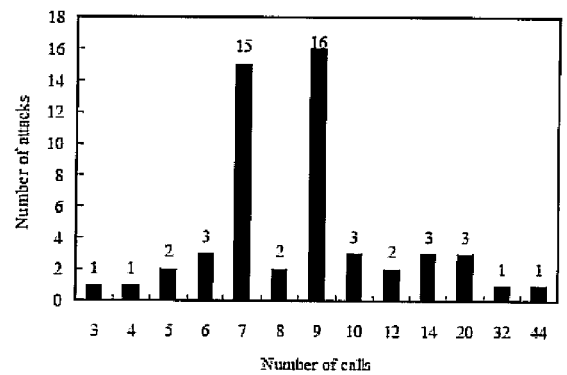
FIG. 8B shows the number of push-calls in an attack request.

Threshold of Push-calls for Scheme 1 FIG. 8A shows that all instruction sequences distilled from a normal request contain at most one push-call code pattern. FIG. 5B shows that for all the 53 buffer overflow attacks we tested, every attack request contains more than two push-calls in one of its instruction sequences. Therefore, by setting the threshold number of push-calls to 2, Scheme 1 can provide zero false positive and false negative in our experiment.

Figure 9A:
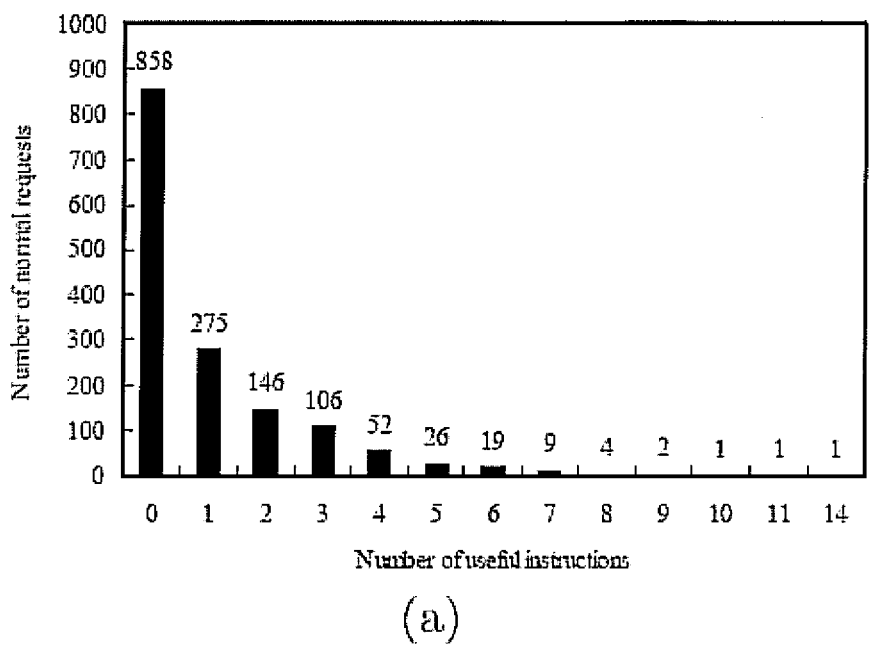
FIG. 9A shows the number of useful instructions in a normal request.
Figure 9B:
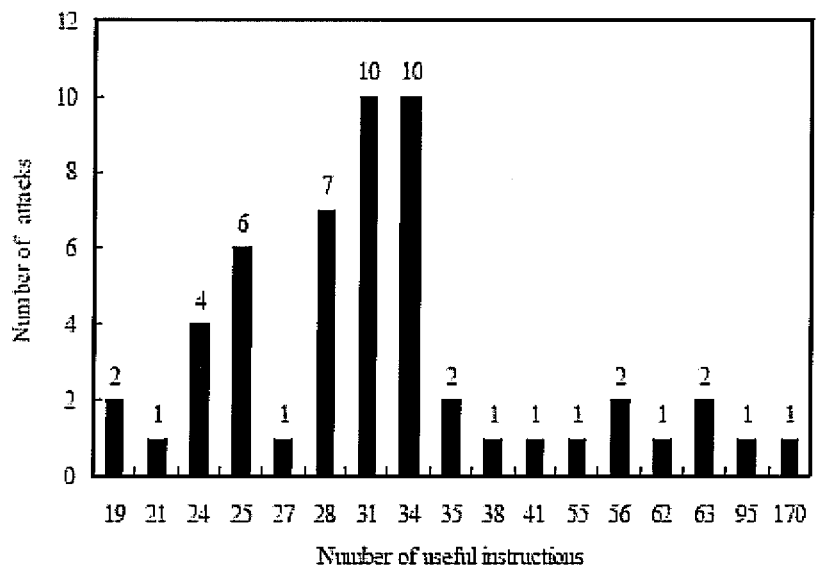
FIG. 9B shows the number of useful instructions in an attack request.
Figure 9C:
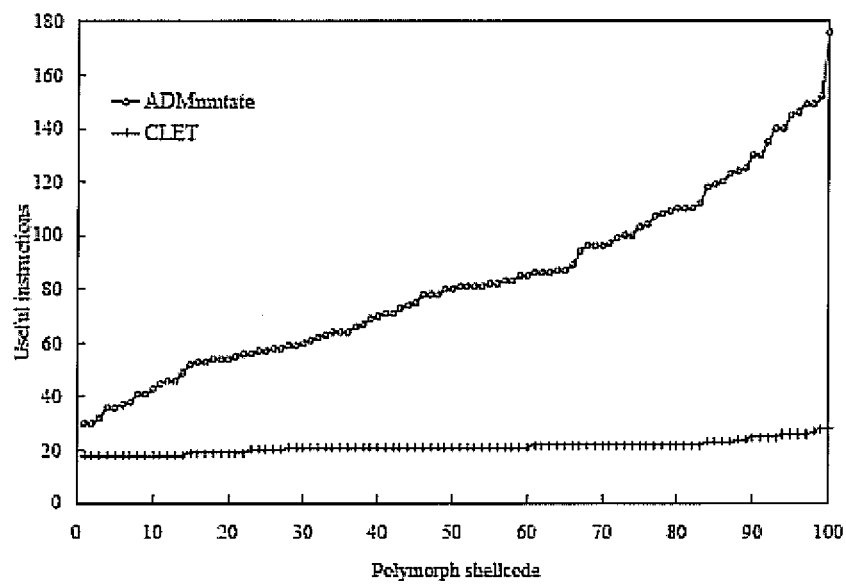
FIG. 9C shows the number of useful instructions of all 200 polymorphic shellcodes.

Threshold of Useful Instructions for Scheme 2. FIG. 9A shows that no normal requests contain an instruction sequence that has more than 14 useful instructions. FIG. 9B shows that an attack request contains over 18 useful instructions in one of its instruction sequences. Therefore, by setting the threshold to a number between 15 and 18 in Scheme 2, we can get zero false positive rate and zero false negative rate in this experiment.

Figure 10A:
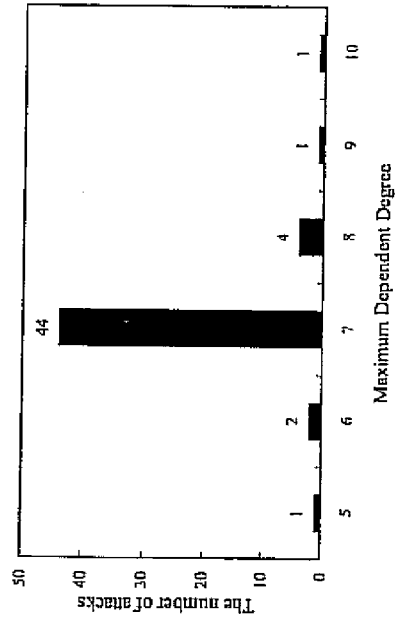
FIG. 10A shows the maximum dependent degree in a normal request. It shows that no normal requests contain an instruction sequence which has over 3 maximum dependent degree.
Figure 10B:
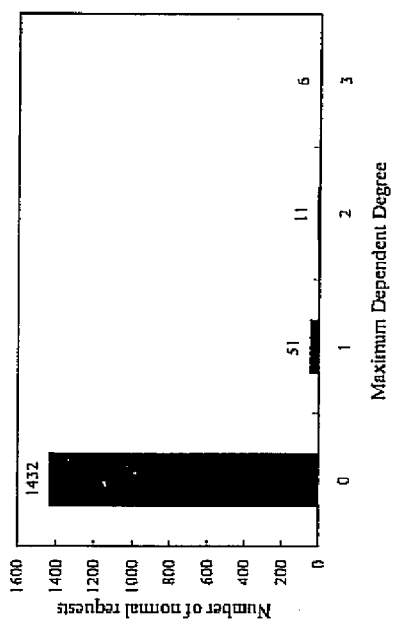
FIG. 10B shows that there exists an instruction sequence of an attack request whose maximum dependent degree is more than 4.

Threshold of Dependent Degree for Scheme 3. FIG. 10A shows that no normal requests contain an instruction sequence whose maximum dependent degree is more than 3. FIG. 10B shows that there exists an instruction sequence of an attack request whose maximum dependent degree is more than 4. Therefore, by setting the threshold to a number 4 or 5, Scheme 3 can detect all the attacks used in our test.

Detection of Polymorphic Shellcode

We also tested SigFree on two well-known polymorphic engine, ADMmutate v0.84 [13] and CLET [14]. Basically, ADMmutate obfuscates the shellcode of buffer overflow attacks in two steps. First, it encrypts the shellcode. Second, it obfuscates the decryption routine by substituting instructions and inserting junk instructions. In addition, ADMmutate replaces the No Operations (NOP) instructions with other one-byte junk instructions to evade the detection of an IDS.

Tis is because most buffer overflow attacks contain many NOP instructions to help locate shellcode, making them suspicious to an IDS.

CLET is a more powerful polymorphic engine compared with ADMmutate. It also fakes NOPs zone with 2,3 bytes instructions and generates a decipher routine with different operations at each time, which makes classical IDS pattern matching ineffective. Moreover, It uses spectrum analysis to defeat data mining methods.

Because there is no push-call pattern in the code, Scheme 1 cannot detect this type of attacks. However, Scheme 2 is still very robust to these obfuscation techniques. This is because although the original shellcode contains more useful instructions than the decryption routine has and it is also encrypted, we can still find enough number of useful instructions in the decryption routines.

Detection by Scheme 2. We generated 100 different attack messages per each of Countdown, JumpCallAdditive, ADMmutate and CLET. For JempiScodes, we generated 300 different attack messages, 100 per each of its three decryption approaches.

Figure 11A:
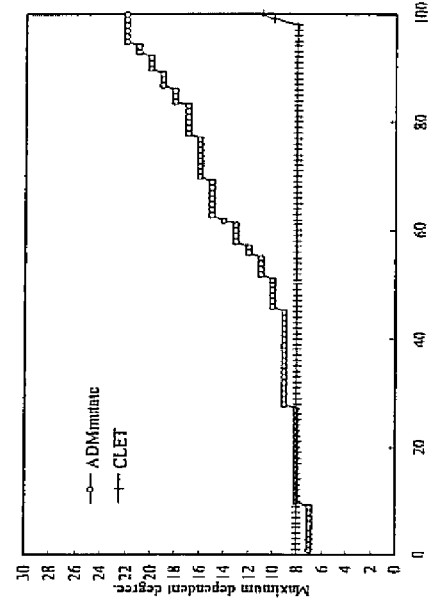
FIG. 11A shows the number of useful instructions in all 200 polymorphic shellcodes. It shows that the least number of useful instructions in ADMmutate and CLET polymorphic shellcodes is 17.

Detection by Scheme 2. We used Scheme 2 to detect the useful instructions in the above 700 attack messages. FIG. 11A shows the (sorted) numbers of useful instructions in 200 polymorphic shellcodes from ADMmutate and CLET. We observed that the least number of useful instructions in these ADMmutate polymorphic shellcodes is 17, whereas the maximum number is 39; the least number of useful instructions in the CLET polymorphic shellcodes is 18, whereas the maximum number is 25. Therefore, using the same threshold value as before (i.e., between 15 and 17), we can detect all the 200 polymorphic shellcodes generated by ADMmutate and CLET. Seven useful instructions are detected in all 100 Countdown polymorphic shellcodes; 11 useful instructions are detected in all 100 JempiScodes and all 300 JumpCallAdditive polymorphic shellcodes. Since the useful instructions of the 500 polymorphic shellcodes generated by Countdown, JempiScodes and JumpCallAdditive are less than our threshold (i.e., between 15 and 17), we cannot detect them by using Scheme 2.

Figure 11B:
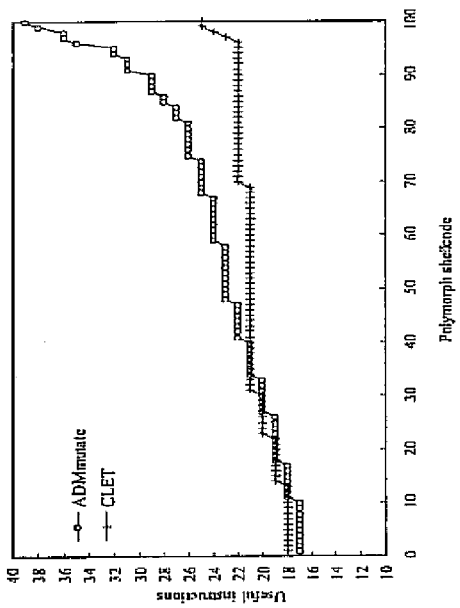
FIG. 11B shows the maximum dependent degree in all 200 polymorphic shellcodes. It shows that the least number of maximum dependent degree in ADMmutate and CLET polymorphic shellcodes is 7.

Detection by Scheme 3. We also used Scheme 3 to detect the maximum dependent degree in the above 700 attack messages. FIG. 11B shows the (sorted) maximum dependent degree in 200 polymorphic shellcodes from ADMmutate and CLET. We observed that the least number of maximum dependent degree in these ADMmutate polymorphic shellcodes is 7, whereas the maximum number is 22; the least number of maximum dependent degree in the CLET polymorphic shellcodes is 8, whereas the maximum number is 11. The maximum dependent degree of 100 Countdown polymorphic shellcodes is 6; The maximum dependent degree of 100 JumpCallAdditive polymorphic shellcodes is 7; The maximum dependent degree of 100 JempiScodes polymorphic shellcodes is 5. Therefore, by using the same threshold value as before (i.e., 4 or 5), we can detect all the 700 polymorphic shellcodes.

CiteSeer Requests. We also tested SigFree over one-month (September, 2005) 397,895 web requests collected by the scientific and academic search engine CiteSeer [ ]. Our test based on the CiteSeer requests did not yield an alarm.

Performance Evaluation

To evaluate the performance of SigFree, we implemented a proxy-based SigFree prototype using the C programming language in Win32 environment. SigFree was compiled with Borland c++ version 5.5.1 at optimization level O2. The prototype implementation was hosted in a Windows 2003 server with Intel Pentium 4, 3.2 GHz CPU and 1 G MB memory.

The proxy-based SigFree prototype accepts and analyzes all incoming requests from clients. The client testing traffic were generated by Jef Poskanzer's httpload program[4] from a Linux desktop PC with Intel Pentium 4 2.5 GHz CPU connected to the Windows server via a 100 Mbps LAN switch. We modified the original http load program so that clients can send code-injected data requests.

[4]http://www.acme.com/software/http load/

For the requests which SigFree identifies as normal, SigFree forwards them to the web server, Apache HTTP Server 2.0.54, hosted in a Linux server with dual Intel Xeon 1.8 G CPUs. Clients send requests from a pre-defined URL list. The documents referred in the URL list are stored in the web server. In addition, the prototype implementation uses a time-to-live based cache to reduce redundant HTTP connections and data transfers.

Figure 12A:
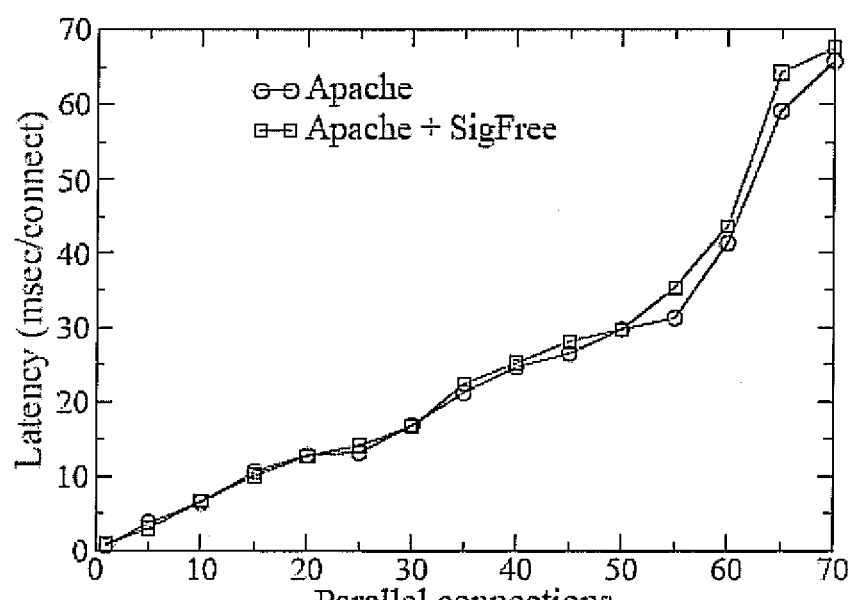
FIG. 12A shows the performance impact of SigFree on Apache HTTP Server.

We measured the average response latency (which indicates throughput although we did not directly measure throughput), of the connections by running http load for 1000 fetches. FIG. 12A shows that when there is no buffer overflow attacks, the average response time in the system with SigFree is only slightly higher than the system without SigFree. This indicates that, despite the connection and ASCII checking overheads, the proxy-based implementation does not affect the overall latency significantly.

Figure 12B:
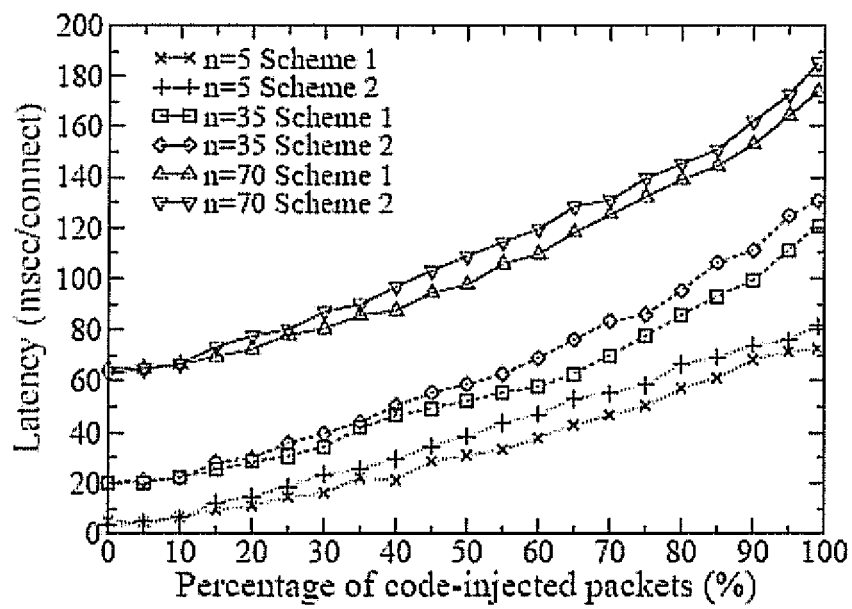
FIG. 12B shows the performance impact of SigFree on Apache HTTP Server.

FIG. 12B shows the average latency of connections as a function of the percentage of attacking traffic. We used CodeRed as the attacking data. Only successful connections were used to calculate the average latency; that is, the latencies of attacking connections were not counted. This is because what we care is the impact of attack requests on normal requests. We observe that the average latency increases slightly worse than linear when the percentage of malicious attacks increases. Generally, Scheme 1 is about 20% faster than Scheme 2.

Overall, our experimental results from the prototype implementation show that SigFree has reasonable performance overhead. Especially when the fraction of attack messages is small (say<10%), the additional latency caused by SigFree is almost negligible.

DISCUSSIONS

Robustness to Obfuscation

Most malware detection schemes include two-stage analysis. The first stage is disassembling binary code and the second stage is analyzing the disassembly results. There are obfuscation techniques to attack each stage [33, 39] and attackers may use them to evade detection. Table I below shows that SigFree is robust to most of these obfuscation techniques.

TABLE I

| | Obfuscation | SigFree | |
|---|---|---|---|
| Disassembly Stage | Junk byte insertion | Yes | |
| | Opaque predict | Yes | |
| | Branch function | Partial | |
| Analysis Stage | Obfuscation | Scheme 1 | Scheme 2 |
| | Instruction reordering | Yes | Yes |
| | Register renaming | Yes | Yes |
| | Garbage insertion | Yes | Yes |
| | Instruction replacement | Yes | Yes |
| | Equivalent funcationality | Yes | Yes |
| | Reordered memory access | Yes | Yes |

Obfuscation in First Stage. Junk byte insertion is one of the simplest obfuscation against disassembly. Here junk bytes are inserted at locations that are not reachable at run-time. This insertion however can mislead a linear sweep algorithm, but cannot mislead a recursive traversal algorithm [32], which our algorithm bases on.

Opaque predicates are used to transform unconditional jumps into conditional branches. Opaque predicates are predicates that are always evaluated to either true or false regardless of the inputs. This allows an obfuscator to insert junk bytes either at the jump target or in the place of the fall-through instruction. We note that opaque predicates may make SigFree mistakenly interpret junk byte as executable codes. However, this mistake will not cause SigFree to miss any real malicious instructions. Therefore, SigFree is also immune to obfuscation based on opaque predicates.

Obfuscation in Second Stage. Most of the second-stage obfuscation techniques obfuscate the behaviors of a program; however, the obfuscated programs still bear characteristics of programs. Since the purpose of SigFree is to differentiate executable codes and random binaries rather than benign and malicious executable codes, most of these obfuscation techniques are ineffective to SigFree. Obfuscation techniques such as instruction reordering, register renaming, garbage insertion and reordered memory accesses do not affect the number of calls or useful instructions which our schemes are based on. By exploiting instruction replacement and equivalent functionality, attacks may evade the detection of Scheme 1, but cannot evade the detection of Scheme 2.

Limitations

SigFree has certain limitations. First, SigFree cannot fully handle the branch-function based obfuscation, as indicated in Table I. Branch function is a function f(x) that, whenever called from x, causes control to be transferred to the corresponding location f(x). By replacing unconditional branches in a program with calls to the branch function, attackers can obscure the flow of control in the program. We note that there are no general solutions for handling branch function at the present state of the art.

With respect to SigFree, due to the obscurity of the flow of control, branch function may cause SigFree to break the executable codes into multiple instruction sequences. Nevertheless, it is still possible for SigFree to find this type of buffer overflow attacks as long as SigFree can still find enough push-calls or useful instructions in one of the distilled instruction sequences.

Second, in some cases, the executable shellcodes could be written in alphanumeric form [40]. Such shellcodes will be treated as printable ASCII data and thus bypass our analyzer. However, those shellcodes are rare and have limited functionality (no arithmetic instructions, no call instructions, operands need to be manipulated, and so on). By turning off the ASCII filter, Scheme 2 can successfully detect alphanumeric shellcodes; however, it will increase unnecessary computational overhead. It therefore requires a slight tradeoff between tight security and system performance.

Application-Specific Encryption Handling

The proxy-based SigFree could not handle encrypted or encoded data. A particular example is SSL-enabled web server. Enhancing security between web clients and web servers by encrypting HTTP messages, SSL also causes the difficulty for out-of-box malicious code detectors. On the other hand, in most web server applications, SSL is implemented as a server module (e.g., mod ssl in apache). Therefore, a SSL module itself could be another target for buffer overflow exploits.

Figure 12C:
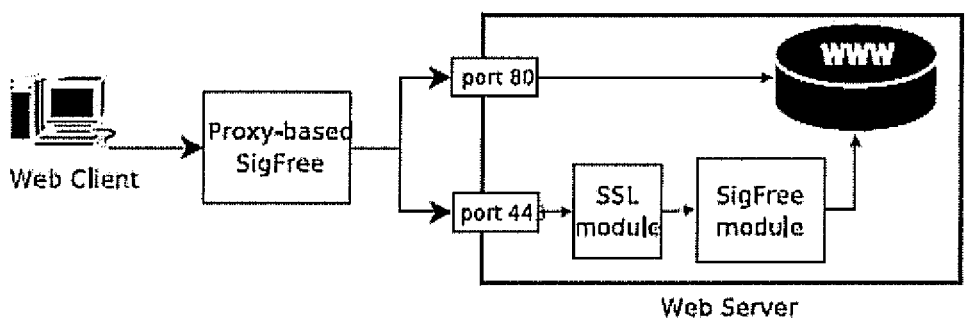
FIG. 12C shows the SigFree with SSL-enabled web server.

To handle SSL connections, we propose a multiphase statical analysis approach (FIG. 12C) to protect both the web server and the SSL module. In this architecture, a proxy-based SigFree will analyze the encrypted SSL messages before the messages are received by the SSL module, and it will discard the encrypted messages with executable codes. The phase thus protects the SSL module and part of the web server which handle SSL messages. After a SSL message is decrypted, another server-module-based SigFree will analyze the decrypted message to detect if there are executable codes embedded. This phase thus ensures the safety of the rest components of the webserver. Most popular webservers allow us to write a server module to process requests and specifying the order of server modules. Thus, we can easily integrate SigFree into webservers to handle SSL messages.

This serial analysis will enhance a webserver's security against buffer overflow exploits. It on the other hand will also increase the latency in handling encrypted SSL messages. We will evaluate this impact as our future work.

APPLICABILITY

So far we only discussed using SigFree to protect webservers. It is worth mentioning that our tool is also widely applicable to many programs that are vulnerable to buffer overflow attacks. For example, the proxy-based SigFree can be used to protect all internet services which do not permit executable binaries to be carried in data, e.g., database servers, email servers, name services, and so on.

In addition to protecting severs, SigFree can also provide file system real-time protection. Buffer overflow vulnerabilities have been found in some famous applications such as Adobe Acrobat and Adobe Reader [41], Microsoft JPEG Processing (GDI+) [42], and WinAmp [43]. This means that attackers may embed their malicious code in PDF, JPEG, or mp3-list files to launch buffer overflow attacks. In fact, a virus called Hesive [44] was disguised as a Microsoft Access file to exploit buffer overflow vulnerability of Microsoft's Jet Database Engine. Once opened in Access, infected .mdb files take advantage of the buffer overflow vulnerability to seize control of vulnerable machines. If mass-mailing worms exploit these kinds of vulnerabilities, they will become more fraudulent than before, because they may appear as pure data-file attachments. SigFree can be used alleviate these problems by checking those files and email attachments which should not include any code.

REFERENCES

[1] Z. Liang and R. Sekar, "Fast and automated generation of attack signatures: A basis for building self-protecting servers," in Proc. 12th ACM Conference on Computer and Communications Security, 2005.

[2] B. A. Kuperman, C. E. Brodley, H. Ozdoganoglu, T. N. Vijayklumar, and A. Jalote, "Detecting and prevention of stack buffer overflow attacks," Communications of the ACM, vol. 48, no. 11 pp. 51-56, 2005.

[3] G. Kc, A. Keromytis, and V. Prevelakis, "Countering code-injection attacks with instruction-set randomization," in Proceedings of the 10th ACM conference on Computer and communications security, pp. 272-280, October 2003.

[4] E. Barrantes, D. Ackley, T. Palmer, D. Stefanovic, and D. Zovi, "Randomized instruction set emulation to disrupt binary code injection attacks," in Proceedings of the 10th ACM conference on Computer and communications security, 2003.

[5] J. Newsome and D. Song, "Dynamic taint analysis for automatic detection, analysis, and signature generation of exploits on commodity software," in NDSS, 2005.

[6] M. Costa, J. Crowcroft, M. Castro, A. Rowstron, L. Zhou, L. Zhang, and P. Barham, "Vigilante: End-to-end containment of internet worms," in SOSP, 2005.

[7] J. Xu, P. Ning, C. Kil, Y. Zhai, and C. Bookholt, "Automatic diagnosis and response to memory corruption vulnerabilities," in Proc. 12th ACM Conference on Computer and Communications Security, 2005.

[8] S. Singh, C. Estan, G. Varghese, and S. Savage, "The early bird system for real-time detection of unknown worms," tech. rep., University of California at San Diego, 2003.

[9] H.-A. Kim and B. Karp, "Autograph: Toward automated, distributed worm signature detection," in Proceedings of the 13th Usenix Security Symposium, August 2004.

[10] S. Newsome, B. Karp, and D. Song, "Polygraph: Automatic signature generation for polymorphic worms," in IEEE Security and Privacy Symposium, May 2005.

[11] R. Chinchani and E. V. D. Berg, "A fast static analysis approach to detect exploit code inside network flows," in RAID, 2005.

[12] "Metasploit project."http://www.metasploit.com.

[13] S. Macaulay, "Admmutate: Polymorphic shellcode engine."http://www.ktwo.ca/security.html.

[14] T. Detristan, T. Ulenspiegel, Y. Malcom, and M. S. V. Underduk, "Polymorphic shellcode engine using spectrum analysis."http://www.phrack.org/show.php?p=61&a=9.

[15] C. Kruegel, E. Kirda, D. Mutz, W. Robertson, and G. Vigna, "Polymorphic worm detection using structural information of executables," in RAID, 2005.

[16] D. Wagner, J. S. Foster, E. A. Brewer, and A. Aiken, "A first step towards automated detection of buffer overrun vulnerabilities," in Network and Distributed System Security Symposium, 2000.

[17] D. Evans and D. Larochelle, "Improving security using extensible lightweight static analysis," IEEE Software, vol. 19, no. 1, 2002.

[18] H. Chen, D. Dean, and D. Wagner, "Model checking one million lines of c code," in NDSS, 2004.

[19] C. Cowan, C. Pu, D. Maier, H. Hinton, J. Walpole, P. Bakke, S. Beattie, A. Crier, P. Wagle, and Q. Zhang, "Stackguard: Automatic adaptive detection and prevention of buffer-overflow attacks," in Proceedings of 7th USENIX Security Conference, January 1998.

[20] T. cker Chiuehand F.-H. Hsu, "Rad: Acompile-time solution to buffer overflow attacks," in ICDCS, 2001.

[21] "Pax documentation." http://pax.grsecurity.net/docs/pax.txt, 2003.

[22] A. Baratloo, N. Singh, and T. Tsai, "Transparent run-time defense against stack smashing attacks," in Proc. 2000 USENIX Technical Conference, June 2000.

[23] G. S. Kc and A. D. Keromytis, "e-nexsh: Achieving an effectively non-executable stack and heap via system-call policing," in Proceedings of the Annual Computer Security Applications Conference (ACSAC), 2005.

[24] J. McGregor, D. Karig, Z. Shi, and R. Lee, "A processor architecture defense against buffer overflow attacks," in Proceedings of International Conference on Information Technology: Research and Education, 2003.

[25] S. Bhatkar, R. Sekar, and D. C. DuVarney, "Efficient techniques for comprehensive protection from memory error exploits," in USENIX Security, 2005.

[26] R. Pang, V. Yegneswaran, P. Barford, V. Paxson, and L. Peterson, "Characteristics of internet background radiation," in Proc. ACMIMC, 2004.

[27] J. Jung, V. Paxson, A. Berger, and H. Balakrishnan, "Fast portscan detection using sequential hypothesis testing," in Proc. IEEE Symposium on Security and Privacy, 2004.

[28] H. J. Wang, C. Guo, D. R. Simon, and A. Zugenmaier, "Shield: Vulnerability-driven network filters for preventing known vulnerability exploits," in Proceedings of the ACMSIGCOMM Conference, August 2004.

[29] M. Christodorescu and S. Jha, "Static analysis of executables to detect malicious patterns," in Proceedings of 12th USENIX Security Symposium, pp. 169-186, August 2003.

[30] M. Christodorescu, S. Jha, S. A. Seshia, D. Song, and R. E. Bryant, "Semantics-aware malware detection," in IEEE Symposium on Security and Privacy, Oakland, May 2005.

[31] A. Lakhotia and U. Eric, "Stack shape analysis to detect obfuscated calls in binaries," in Proceedings of Fourth IEEE International Workshop on Source Code Analysis and Manipulation, pp. 17-26, September 2004.

[32] C. Kruegel, W. Robertson, F. Valeur, and G. Vigna, "Static disassembly of obfuscated binaries," in Proceedings of USENIX Security 2004, pp. 255-270, August 2004.

[33] C. Linn and S. Debray, "Obfuscation of executable code to improve resistance to static disassembly," in 10th ACM Conference on Computer and Communications Security, 2003.

[34] T. Berners-Lee, L. Masinter, and M. McCahill, "Uniform Resource Locators (URL)." RFC 1738 (Proposed Standard). Updated by RFCs 1808, 2368,2396, 3986.

[35] B. Schwarz, S. K. Debray, and G. R. Andrews, "Disassembly of executable code revisited," in Proc. IEEE 2002 Working Conference on Reverse Engineering, 2062.

[36] L. D. Fosdick and L. Osterweil, "Data flow analysis in software reliability," ACM Computing Surveys, vol. 8, 1976.

[37] J. Huang, "Detection of data flow anomaly through program instrumentation," IEEE Transactions on Software Engineering, vol. 5, pp. 226-236, May 1979.

[38] "Intel ia-32 architecture software developer's manual volume 1: Basic architecture."

[39] C. Collberg, C. Thomborson, and D. Low, "A taxonomy of obfuscating transformations," Tech. Rep. 148, Department of Computer Science, University of Auckland, July 1997.

[40] rix, "Writing ia32 alphanumeric shellcodes."http://www.phrack.org/show.php?p=57&a=15, 2001.

[41] "Security advisory: Acrobat and adobe reader plug-in buffer overflow,"http://www.adobe.com/support/techdocs/321644.html.

[42] "Buffer overrun in jpeg processing (gdi+) could allow code execution,"http://www.microsoft.com/technet/security/bulletin/MS04-028.mspx.

[43] "Winamp3 buffer overflow."http://www.securityspace.com/smysecure/catid.html?id=11530.

[44] "Symantec security response-backdoor.hesive."http://securityresponse.symantec.com/avcenter/venc/data/backdoor.hesive.html.

We claim:

1. A method of blocking buffer-overflow attacks, the method being signature-free, thereby enabling new and unknown attacks to be blocked in addition to known attacks, the method comprising the steps of:

receiving a service-requesting packet having a payload content at a computer system to be protected;

disassembling the payload content;

constructing an instruction flow graph based upon the disassembled payload content;

extracting instruction sequences from the instruction flow graph;

refining the flow graph by pruning useless instruction sequences which do not affect instruction flow, while retaining useful instruction sequences which do affect instruction flow;

determining if the number of useful instructions in an instruction sequence exceeds a predetermined threshold;

flagging the instruction sequence as an executable program or a fragment of an executable program if the number of useful instructions exceeds the threshold;

blocking the packet if any of the instruction sequences are flagged as executable programs or fragments of an executable program; and wherein the steps of disassembling and analyzing the payload content and examining potential instruction sequences do not involve comparisons to previously generated signatures defining unique patterns associated with known worm packets.

2. The method of claim 1, wherein every byte in the packet is considered as a possible starting point of an instruction sequence.

3. The method of claim 1, wherein the steps are performed as a proxy between the service and the corresponding firewall.

4. The method of claim 1, wherein the system provides an Internet-based service.

5. The method of claim 1, wherein the system is a webserver.

6. The method of claim 1, wherein the system is a database server.

7. The method of claim 1, wherein the system is an email server.

8. The method of claim 1, wherein the system provides name services.

9. The method of claim 1, wherein the system is a file system.

10. The method of claim 1, wherein the packet is a secure socket layer (SSL) packet.

11. The method of claim 1, wherein:

the packet includes a uniform resource identifier (URI); and the method includes the step of decoding the URI and limiting the allowed characters in the packet to a subset of the ASCII character set.

12. The method of claim 11, wherein, if the query parameters of the request-URI and request-body of a request are both printable ASCII ranging from 20-7E in hex, the request is allowed to pass.

* * * * *

UNITED STATES PATENT AND TRADEMARK OFFICE
CERTIFICATE OF CORRECTION

PATENT NO. : 8,443,442 B2  
APPLICATION NO. : 11/668699  
DATED : May 14, 2013  
INVENTOR(S) : Xinran Wang et al.

It is certified that error appears in the above-identified patent and that said Letters Patent is hereby corrected as shown below:

In the Specification

Column 3, line 19, Delete "TEE", Insert --THE--

Column 5, line 29, Delete "bufer", Insert --buffer--

Column 6, line 45, Delete "[331]", Insert --[33]--

Column 10, line 34, Delete "ruining", Insert --running--

Column 13, line 42, Delete "dump", Insert --(jump--

Column 14, line 38, Delete "5B", Insert --8B--

Column 15, line 1, Delete "Tis", Insert --This--

Column 16, line 41, Delete "alnost", Insert --almost--

Column 18, line 53, Delete "Vijayklumar", Insert --Vijaykumar--

Column 19, line 14, Delete "[10] S.", Insert --[10] J.--

Column 19, line 40, Delete "A. Crier", Insert --A. Grier--

Column 20, line 29, Delete "2062", Insert --2002--

Signed and Sealed this  
Sixth Day of January, 2015

Michelle K. Lee  
*Deputy Director of the United States Patent and Trademark Office*